United States Patent
Wong et al.

(10) Patent No.: US 6,337,686 B2
(45) Date of Patent: *Jan. 8, 2002

(54) METHOD AND APPARATUS FOR LINE ANTI-ALIASING

(75) Inventors: Daniel Wai-him Wong, Willowdale; Milivoje M. Aleksic, Richmond Hills, both of (CA)

(73) Assignee: ATI Technologies Inc., Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/004,036

(22) Filed: Jan. 7, 1998

(51) Int. Cl.$^7$ .............................................. G06T 11/20
(52) U.S. Cl. ...................................................... 345/443
(58) Field of Search ......................................... 345/443

(56) References Cited

U.S. PATENT DOCUMENTS

| | | | | |
|---|---|---|---|---|
| 5,297,244 A | * | 3/1994 | Pomichter, Jr. ............. | 395/143 |
| 5,375,196 A | * | 12/1994 | Vatti et al. ................... | 395/143 |
| 5,635,699 A | * | 6/1997 | Cherry et al. ............... | 235/462 |
| 5,670,981 A | * | 9/1997 | Jensen ......................... | 345/118 |
| 5,815,162 A | * | 9/1998 | Levine ......................... | 345/443 |
| 5,872,902 A | * | 2/1999 | Kuchkuda et al. .......... | 395/130 |

OTHER PUBLICATIONS

Schilling, "A New Simple and Efficient Antialiasing with Subpixel Masks" Jul. 1991.*
Lathrop et al., "Accurate rendering by subpixel addressing", Sep. 1990.*
Foley et al., *Computer Graphics: Principles and Practice, Second Edition Inc.*, pp. 132–137, 1995.*

* cited by examiner

Primary Examiner—Mark Zimmerman
Assistant Examiner—Lance W. Sealey
(74) Attorney, Agent, or Firm—Vedder, Price, Kaufman & Kammholz

(57) ABSTRACT

A method and apparatus for processing line anti-aliasing begins by walking a mathematical line based on the Bresenham technique. While walking the mathematical line at each pixel along the mathematical line- pixel coverage area is determined for each pixel of a set of pixels, where the set of pixels traverse a minor direction of the mathematical line. Note that for the mathematical line, the minor direction is the X direction when $\Delta Y$ is greater than $\Delta X$ and is in the Y direction when $\Delta X$ is greater than $\Delta Y$. Once the coverage pixel coverage area of each pixel in the set of pixels has been determined, the intensity for each pixel in the set of pixels is determined. The intensity corresponds to the particular RGB value being generated for subsequent display.

5 Claims, 7 Drawing Sheets

METHOD AND APPARATUS FOR LINE ANTI-ALIASING

TECHNICAL FIELD OF THE INVENTION

The present invention relates generally to video graphics processing, and more particularly, to video graphics processing of line anti-aliasing.

BACKGROUND OF THE INVENTION

The basic architecture of a computing device is known to include a central processing unit ("CPU"), system memory, input/output ports, an address generation unit ("AGU"), program control circuitry, interconnecting buses, audio processing circuitry, and video processing circuitry. As the technology of the computing device elements continues to advance, computing devices are being used in more and more commercial applications. For example, computer devices are used in video game players, personal computers, work stations, video cameras, video recorders, televisions, etc. The technological advances are also enhancing video quality, audio quality, and the speed at which computing devices can process data. The enhancements of video quality are a direct result of video graphic circuit evolution.

Video graphics circuits have evolved from providing simple text and two-dimensional images to relatively complex three-dimensional images. Such evolution began with high-end computers such as workstations, where the use of complex and costly circuitry is more commercially viable. For example, anti-aliasing started with high-end computers. In general, anti-aliasing is a technique that visually compensates for jagged edges of displayed images that result because of the finite size of pixels. The visual compensation begins by creating subpixel masks for each object that is to be drawn within a pixel. The resulting subpixel masks for a pixel are then processed to produce pixel information for the given pixel. For example, assume that three objects are partially contained within a pixel. The first object has twenty-five percent (25%) coverage of the pixel. The second object has thirty percent (30%) coverage and the third object has twenty-five percent (25%) coverage of the pixel. The remaining twenty percent (20%) of the pixel is covered by background information. Once this data is obtained, the pixel information for the pixel is created from proportional contributions of pixel information of each object and the background.

The basis process of generating and utilizing subpixel masks has been discussed in several prior art references such as "A new simple and efficient anti-aliasing with subpixel masks" by Andreas Schilling, et. al, Computer Graphics, volume 25, number 4, July 1991, and "the A-buffer, an anti-alias surface method" by Loren Carpenter, Computer Graphics, volume 18, number 3, July 1984. While each of these references discuss a viable means for producing anti-aliasing, the schemes were not designed in terms of optimizing memory requirements. Nor were these techniques designed to take advantage of existing video processing technology.

As is known, the amount of memory required for any processing device directly affects the cost of the processing device. Thus, the more memory requirements can be reduced, the more inexpensively the processing device can be produced. To make anti-aliasing commercially viable to the general public, the cost of video graphic processing circuits needs to be reduced by reducing the memory requirements and taking advantage of existing video graphic processing techniques. Therefore, a need exists for a commercially viable video graphics processing method and apparatus that performs line anti-aliasing.

DETAILED DESCRIPTION OF A PREFERRED EMBODIMENT

Generally, the present invention provides a method and apparatus for processing line anti-aliasing. The process begins by walking a mathematical line based on the Bresenham technique. While walking the mathematical line—at each pixel along the mathematical line—pixel coverage area is determined for each pixel of a set of pixels, where the set of pixels traverses a minor direction of the mathematical line. Note that for the mathematical line, the minor direction is the X direction when $\Delta Y$ is greater than $\Delta A$ and is in the Y direction when $\Delta A$ is greater than $\Delta Y$. Once the coverage pixel coverage area of each pixel in the set of pixels has been determined, the intensity for each pixel in the set of pixels is determined. The intensity corresponds to the particular RGB value being generated for subsequent display. With such a method and apparatus, the Bresenham technique may be utilized, which is used in other video graphic processing functions, to assist in the generation of line anti-aliasing. As such, memory requirements for storing line anti-aliasing information is substantially reduced.

Figure 1:
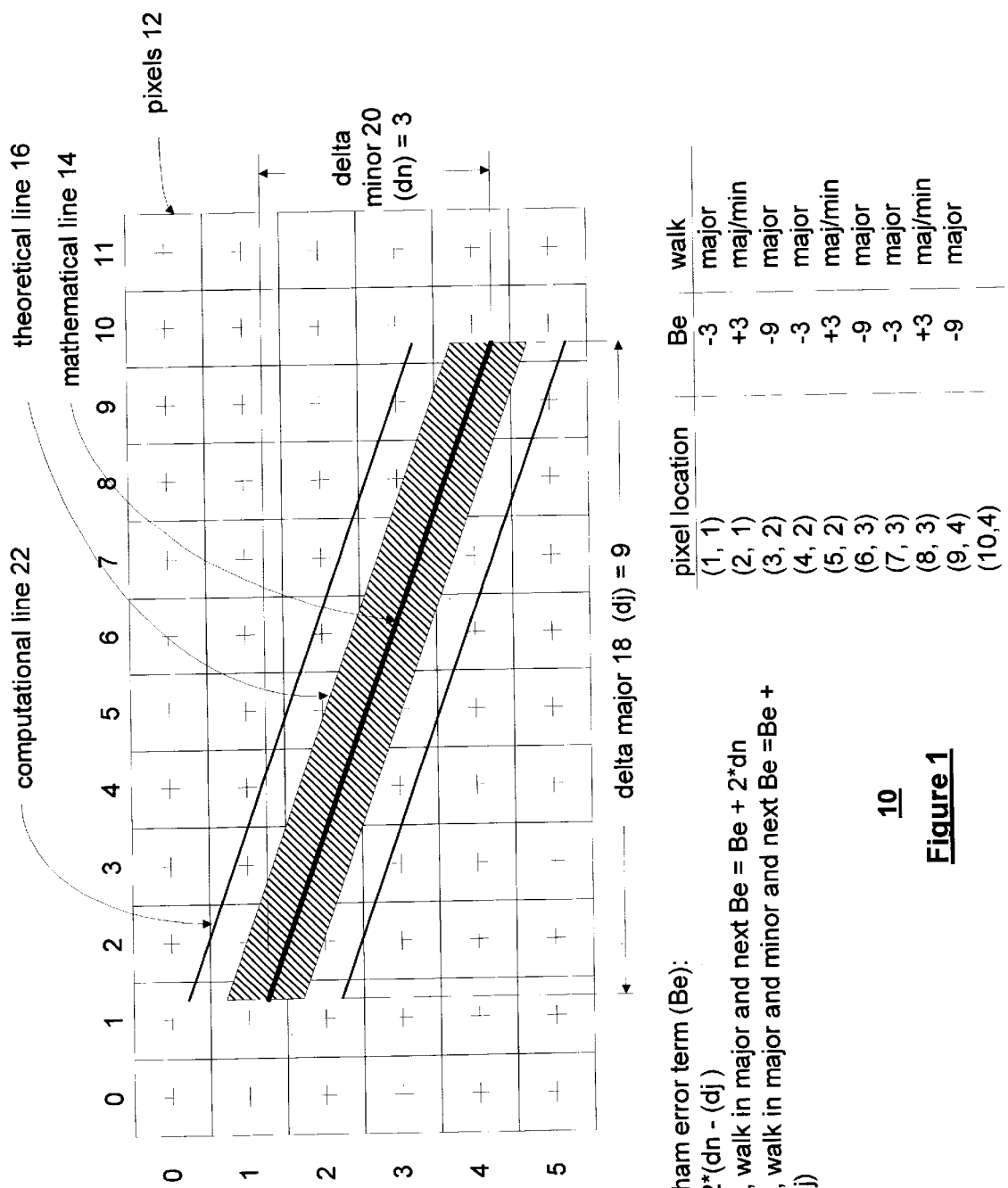
FIG. 1 illustrates a graphic representation of a line with anti-aliasing in accordance with the present invention.

The present invention can be more fully described with reference to FIGS. 1 through 6. FIG. 1 illustrates a graphical representation of a line 16 displayed on a pixel grid 12. The line 16 has a theoretical width of 0, which is represented by a mathematical line 14. The line 16, however, has a width of at least one pixel due to the physical limitations of displays. To process the anti-aliasing of line 16, computational lines 22 are used. Each computational line 22 is shown a pixel distance from the mathematical line 14. Note that the computational lines 22 may be further from the mathematical line when the thickness of the line is greater than one pixel. Further note, for this illustration, the X direction is from the left of the page to the right and the Y direction is from the top of the page to the bottom.

Line 16 is shown to begin at pixel location (1,1) and ends at pixel location (10,4). Given this information, the slope, the minor direction, the major direction, delta major, and delta minor can readily be determined. For example, the slope is 3/9 (i.e., delta minor divided by delta major), the minor direction is the +Y direction, the major direction is the +X direction, delta minor 20 (dn) is three, and delta major 18 (dn) is nine.

To determine the anti-aliasing of line 16, the mathematical line 14 is walked based on the Bresenham technique. The walking begins at pixel location (1,1) by generating a Bresenham error term (Be) therefor. The Bresenham error term at the initial pixel location is derived from the equation (Be)=2* (dn−dj). For this example, the initial Bresenham error term is −3. Because the Bresenham error term is less than zero, the walking to the next pixel is in the major direction, which is pixel location (2,1). When the current Bresenham error term is less than 0, the next Bresenham error term is Be=Be+2*dn, which, for this example, equals +3. Because the Bresenham is now greater than zero, walking to the next pixel is done in both that major and minor direction, which is pixel location (3,2). When the current Bresenham error term is greater than zero, the next Bresenham error term is Be=Be+2* (dn−dj), which, for this example, equals −9. Walking the rest of line 16 is done based on these equations and is shown in the table of FIG. 1.

Figure 2:
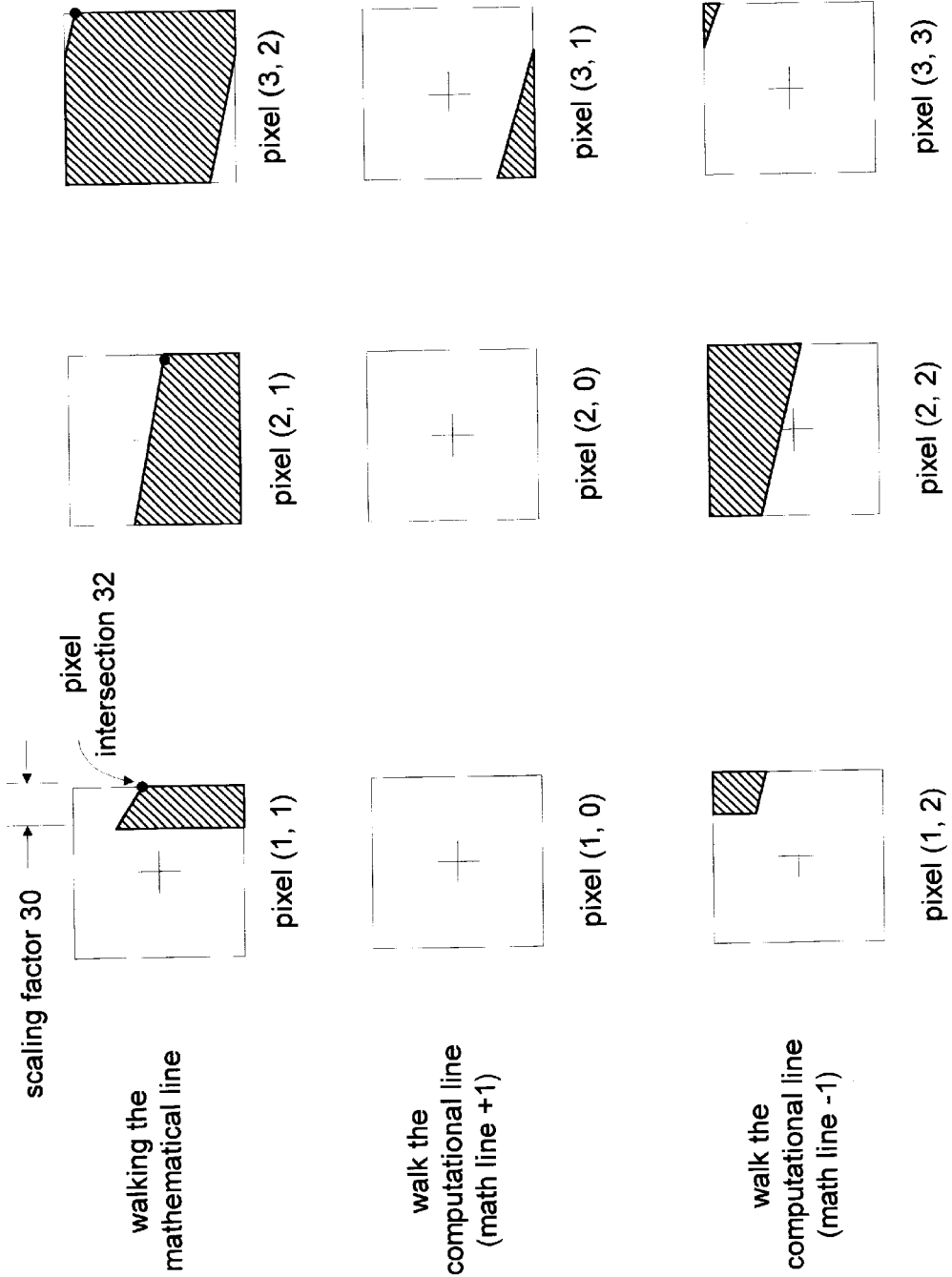
FIG. 2 illustrates a pixel by pixel representation of the line being drawn in FIG. 1.

FIG. 2 illustrates the coverage area of the line at several pixel locations. The pixel coverage area may be determined in a plurality of ways. For example, the cover area of a pixel may be calculated on the fly by determining the pixel intersection 32 and then calculating the other pixel intersections to generate the corners of a polygon. Having the corners of a polygon, the coverage area can be determined. Alternatively, the pixel coverage areas may be precalculated and stored in a look-up table. The look-up table is then addressed based on a pixel error term and the slope of the line. To minimize additional circuitry, the pixel error term may be derived from the Bresenham error term, where Pe=Be/dj. The pixel error term can be readily derived while walking the line 16.

As mentioned, the walking line 16 begins at pixel location (1,1). To calculate the pixel coverage area of pixel location (1,1), the pixel error term is calculated, which is −0.333 (−3/9). From this value and the scope, the coverage area of a pixel is obtained, but for a pixel that has the line running completely through it. To compensate for being an end pixel, a scaling factor 30 is used to determine the exact coverage area of the pixel. Note that al pixel area coverage calculations are derived at subpixel accuracy. Such subpixel accuracy may be a 4×4, 8×8, or 16×16 subpixel divisions. Having calculated the coverage area of the initial end-point pixel, i.e., pixel location (1,1), the process can proceed in many directions. For example, the process may walk the entire mathematical line 14, then walk one computational line and then the other, calculating pixel coverage areas as it walks. As an alternate approach, the pixel coverage area of the pixels in a set of pixels may be determined at one time. Thus, the coverage area at pixel location (1,1) may be determined, then at pixel location (1,0) and then at pixel location (1,2). In either case the resulting pixel coverage area would be determined. Further note that if the thickness of line 16 were greater than one pixel, the coverage area of more pixels would be determined. This can be visualized by referring back to FIG. 1 and picturing line 16 having a width of two or more pixels.

Returning to the discussion of FIG. 2, the coverage area for each pixel along the mathematical line is determined either by an on-the-fly calculation or by accessing a look-up table. The coverage area from pixel locations (2,1) and (3,2) is shown. The coverage area for each pixel along the mathematical line is derived in a similar fashion. Once the mathematical line is walked, the computational line (mathematical line plus one pixel along minor direction) is walked to derive the pixel coverage area of the pixels along this line. The pixels have the coverage areas as shown at pixel location (1,0), pixel location (2,0), pixel location (3,1), etc. Next, the other computational line (the mathematical line minus one pixel along the minor direction) is walked to derived pixel coverage area for each of pixel along the line. Pixels along this line include pixel location (1,2), pixel location (2,2) and pixel location (3,3).

Figure 3:
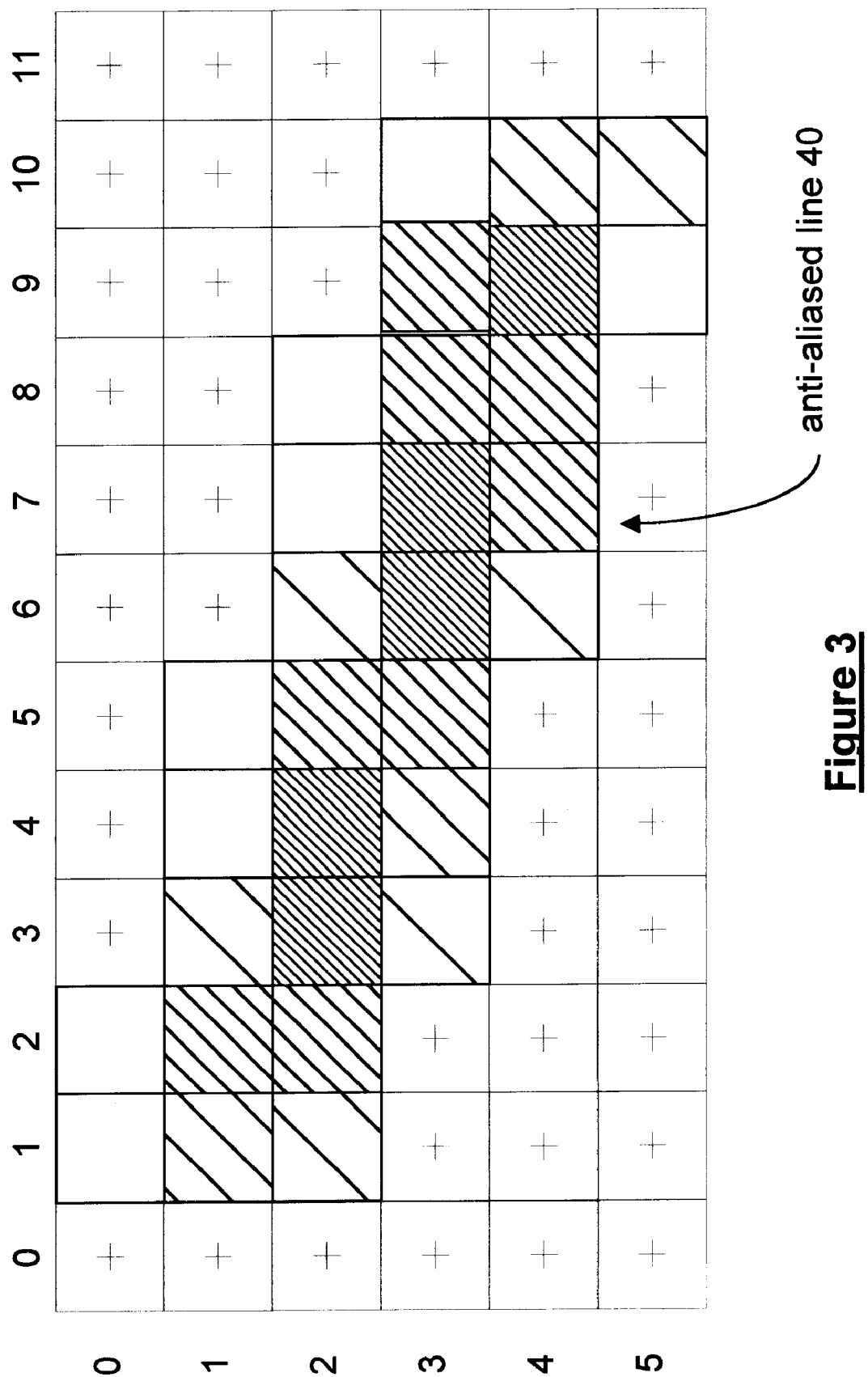
FIG. 3 illustrates a graphical representation of the pixel information of the line of FIG. 1.

Having determined the pixel coverage area, the intensity for each pixel is then determined. FIG. 3 illustrates the intensity representation for each set of pixels (e.g., (1,0), (1,1) and (1,2)) along the line 16. The greater intensity of a pixel is represented by more cross-hashed lines. As shown, the greater the intensity, the darker the pixel location. Thus, at the start of the line (e.g., pixel location (1,1)), the intensity is relatively small since the coverage area is a relatively small portion of the pixel. At pixel location (1,0), there is no coverage area of the line thus the pixel has no intensity component from the line. As the line is walked, the intensity varies. For example, at pixel location (2,1) where approximately half the pixel is covered, the intensity is approximately half. At pixel location (3,2), which is almost completely covered, the intensity is much greater. Note that for RGB data, a binary value of 0 represents minimum intensity while a binary value of 255 represents maximum intensity.

Figure 4:
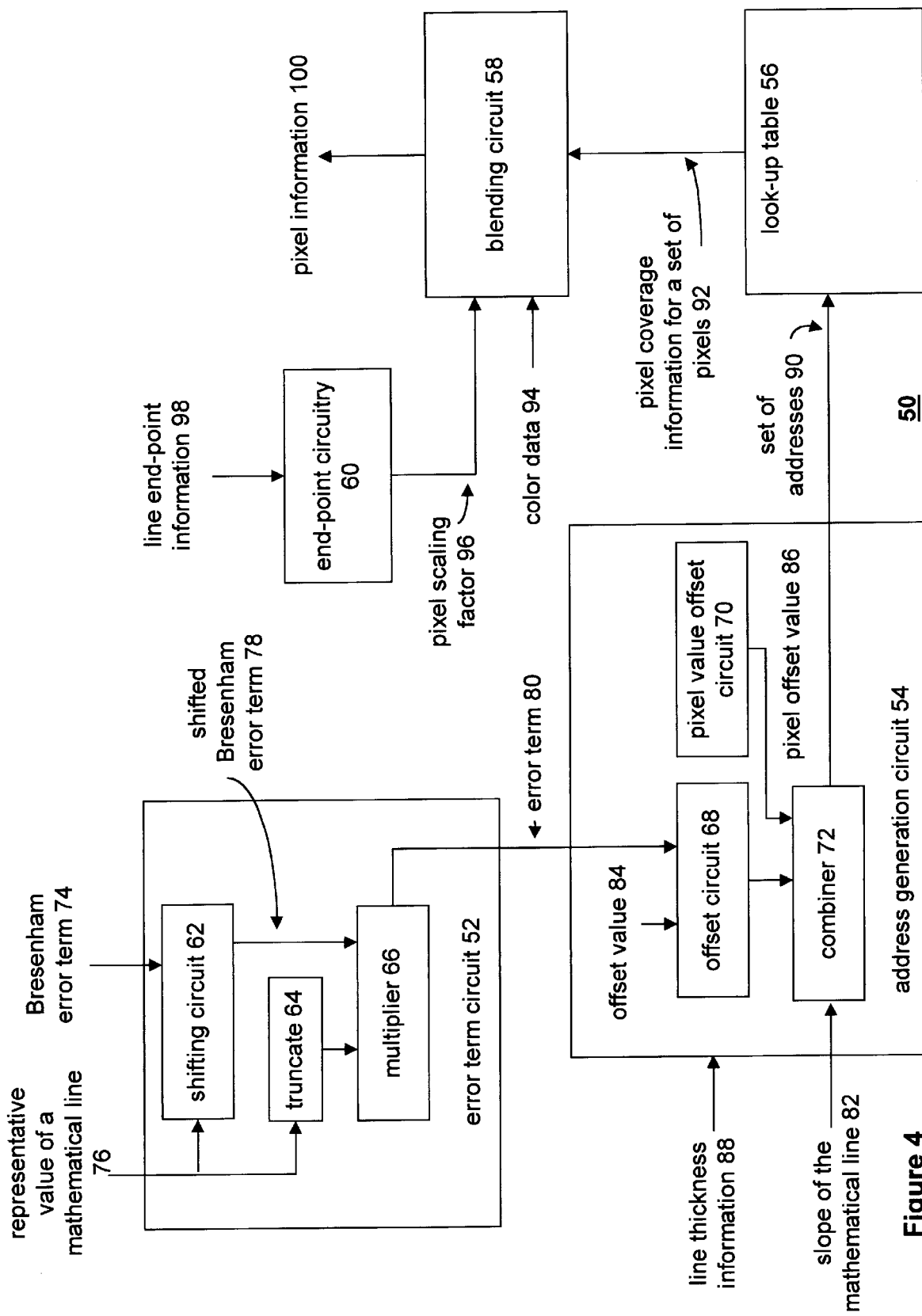
FIG. 4 illustrates a schematic block diagram of a video processing circuit that performs line anti-aliasing in accordance with the present invention.

FIG. 4 illustrates a schematic block diagram of a video processing circuit that would perform line anti-aliasing in accordance with the present invention. The video graphics circuit 50 includes an error term circuit 52, an address generation circuit 54, a look-up table 56, a blending circuit 58, and an end-point circuitry 60. Each of these circuits may be implemented as discreet hardware components, discreet software components, or a combination thereof. Alternatively, they may be generated as a single processing device, which is implemented in either hardware and/or software.

In essence, the video graphics circuit of 50 of FIG. 4 performs the following mathematical equations.

To satisfy a 4×4 subpixel anti-aliasing requirement, 3 bits for slope and 4 bits for error are used. The Bresenham error term must be scaled to its useful range of [−1,1] before coverage determination. The Bresenham algorithm avoids floating point operations by scaling up the error term with dx (or dj), hence, the scaled error term is $$e_{dj}(j,n)=(j-j_a)dn-(n-n_a)dj$$

where dj is delta in major direction, dn is delta in minor direction. The scaled increments are $$\Delta e_{dj}^{major} = dn$$

$$\Delta e_{dj}^{major+minor} = dn - dj$$

If screen coordinates are correct to s fractional bits, all screen coordinates are scaled to the left by s to strive for integer arithmetic, hence dj and dn are also scaled by the same amount. The resulting error term is scaled not just by dj but also by s twice.

The line can now be walked using Bresenham error term. Given a current pixel j,n) along the major and minor axes, the error term is measured at $$e_{dj}\left(j + jStep, n + \frac{1}{2}nStep\right)$$

to determine stepping direction. If the error term is positive, stepping must be done both in major and in minor directions. If the error term is negative, stepping should be done only along the major direction. When the error term is zero, some rules must be applied to determine if the zero should be considered positive or not. As in the Bresenham scheme, the incremental terms can be precalculated.

Before the error term can be feed to the anti-aliasing coverage look-up table (LUT) however, the error term needs to be properly adjust back to the Euclidean coordinates. This should be done once for every pixel we walked. The exact term is given by $$e = \frac{e_{dj}}{2^s dj}$$

A four fractional error bits is needed to feed into the LUT mechanism, so what is needed is $$2^4 e = 2^{4-s} \frac{e_{dj}}{dj}$$

To interpolate attributes, we need 1/dj anyway, and this will be a floating point number, yielding $$2^4 e = 2^{4-s} e_{dj} \times djInv$$

or $$2^4 e = 2^{4-s} e_{dj} \times mantissa(djInv) \times 2^{exponent(djInv)}$$
$$= 2^{4-s+exponent(djInv)} e_{dj} \times mantissa(djInv)$$

Thus, a formulation is arrived at that allows collection of just the number of bits desired for multiplication. The first half of the equation $$2^{4-s+exponent(djInv)} e_{dj}$$

which indicates the number of bits to shift to obtain the lowest 4 bits as fractional bits for the error term. If s=4 and the amount of shift reduces to exponent(djInv). The remaining factor mantissa(djInv)

is normalized and is always in the form of 1.xxx. . . x. If p fractional bits is used from the error term and q fractional bits from the mantissa, a (p+1)×(q+1) multiplier is needed, producing (p+q) fractional bits with a maximum deviation of $$2^{-q} + 2^{-p+1}$$

To perform the above equations, the error term circuit 52 includes a shifting circuit 62 that receives the Bresenham error term 74 and a representative value of the mathematical line 76. The representative value of the mathematical line 76 may be an inversion of the Delta major term of the mathematical line. From these values, the shifting circuit 62 shifts the Bresenham error term 74 by the representative value 76. The resulting value is a shifted Bresenham error term 78, which is provided to a multiplier 66. The other input to multiplier 66 comes from a truncation circuit 64, which truncates the representative value 76. For example, the truncation circuit 64 may take the mantissa portion of the representative value and truncate it to the upper 4 bits. Multiplier 66 multiplies the shifted Bresenham error term 78 and the truncated representative value to produce the pixel error term 80. The pixel error term 80 is used to index the look-up table 56 to retrieve the coverage area for the particular pixel of interests.

The address generation circuit 54 generates addresses for the accessing the look-up table 56, where the addresses are generated from the error term 80 and the slope of the line 82. To accomplish this, the address generation circuit 54 includes an offset circuit 68, a pixel value offset circuit 70, and a combiner 72. The offset circuit 68 receives the error term 80 and an offset value 84, where the error term 80 ranges from −1 to +1. The offset value 84 adjusts the error term 80 to be greater than zero such that positive indices to access the look-up table 50 may be used. For example, assume that the error term range has thirty-two segments. As such, the offset value is 01000 (binary). As one skilled in the art will readily appreciate, the segmentation of the error term may be greater or less than thirty-two, and the offset value would be adjusted accordingly.

The output of offset circuit 68 is provided to the address combining circuit 72, which combines the offset error term with the slope 82 of the mathematical line to produce a set of addresses 90. The address combining circuit 72 may further combine a pixel offset value 86 with the slope 82 and offset error term to produce the set of addresses. A pixel offset value circuit 70 generates the pixel offset value 86. The pixel offset value circuit 82 generates a null value when the mathematical line is being walked, generates a positive pixel offset value when the first computation line (mathematical line +1 pixel) is being walked, and generates a negative pixel offset value when the other computational line (mathematical line −1 pixel) is being walked. Note that the address generation circuit 54 uses line thickness information 88 to generate the appropriate addresses when the line is thicker than 1 pixel.

The set of addresses 90 include a single address when each line is walked individually (e.g., the mathematical line is walked, then a computational line, and then the other) or it includes a plurality of addresses when the lines are walked simultaneously. The look-up table 56 receives the set of addresses 90 and subsequently retrieves pixel coverage information for a set of pixels 92, where the set of pixels may include one pixel when each line is walked separately or a group of pixels.

The look-up table 56 is a memory device such as read-only memory, random access memory, CD ROM, floppy disk, hard drive, or any other device for storing digital information. The look-up table contains pre-determined coverage areas based on particular slopes of the line and points of intersection, which are addressable by the set of addresses 90. By generating the set of addresses 90 from the Bresenham error term minimal additional circuitry is needed. In addition, by generating the look-up table 56 via the following programming instructions, which are included as an example, memory requirements are minimized:

```
#define CoverageBiT 7
void CoverageAreaForWidth_1(double delta, double e, byte *result)
{
        double adjust = 0.5 * sqrt (1.0 + delta * delta);      // get span
        double eAdjust = e – 0.5 * delta;                      // adjust half minor to arrive at
edge
        double e0 = eAdjust + adjust, e1 = eAdjust – adjust;           // intersections at larger
minor edge
        double e0p = e0 – delta, e1p = e1 – delta;             // intersections at smaller minor
edge
        int p[3];
        int fullCoverage = 1 << CoverageBiT;
        int halfCoverage = fullCoverage >> 1;
        p[1] = fullCoverage;
        // obtain areas
        if(e0 <= 0.0) p[0] = 0, p[1] –= Round( –( e0 + e0p ) * halfCoverage);
        else if (e0p < 0)
            p[0] = Round(  e0*e0*halfCoverage / delta ), p[1] –= Round(
e0p*e0p*halfCoverage / delta);
        else p[0] = Round((e0 + e0p) * halfCoverage);
        if(e1p >= –1) p[2] = 0, p[1] –= Round( (2 + e1 + e1p) * halfCoverage);
        else if(e1 > –1.0)
            p[2] = Round( (e1p + 1) * (e1p + 1) * halfCoverage / delta),
            p[1] –= Round( (e1 + 1) * (e1 + 1) * halfCoverage / delta);
        else p[2] = Round( (–e1 – e1p – 2) * halfCoverage);
        // clamp and put results
        for (int i=0; i<3; i++) {
                if(p[i] < 0) p[i] =0;
                else if(p[i] > fullCoverage) p[i] = fullCoverage;
                result[i] = p[i];
        }
}
```

Here are the results with the MSbytes representing the coverage at one forward minor step, LSbytes representing the coverage at one backward minor step and the central bytes representing the coverage at the pixel selected by the Bresenham line algorithm:

```
int width_1_table[ ] = {
// slope=1/16    3/16       5/16       7/16       9/16       11/16      13/16      15/16
0x003c44, 0x002d55, 0x001f67, 0x00127a, 0x000580, 0x000080, 0x000080, 0x000080, // e = –31/32
0x00443c, 0x00354d, 0x00275f, 0x001a72, 0x000d80, 0x000080, 0x000080, 0x000080, // e = –29/32
0x004c34, 0x003d45, 0x002f57, 0x00226a, 0x00157d, 0x000a80, 0X000080, 0X000080, // e = –27/32
0x00542c, 0x00453d, 0x00374f, 0x002aE2, 0x001d75, 0x001280, 0x000680, 0x000080, // e = –25/32
0x005c24, 0x004d35, 0x003f47, 0x00325a, 0x00256d, 0x001a80, 0x000e80, 0x000480, // e = –23/32
0x00641c, 0x00552d, 0x00473f, 0x003a52, 0x002d65, 0x00227a, 0x001680, 0x000c80, // e = –21/32
0x006c14, 0x005d25, 0x004f37, 0x00424a, 0x00355d, 0x002a72, 0x001e80, 0x001480, // e = –19/32
0x00740c, 0x00651d, 0x00572f, 0x004a42, 0x003d55, 0x00326a, 0x00267e, 0x001c80, // e = –17/32
0x007c04, 0x006d15, 0x005f27, 0x00523a, 0x00454d, 0x003a62, 0x002e76, 0x002480, // e = –15/32
0x047c00, 0x00750d, 0x00671f, 0x005a32, 0x004d45, 0x00425a, 0x00366e, 0x002c80, // e = –13/32
0x0c7400, 0x027a06, 0x006f17, 0x00622a, 0x00553d, 0x004a52, 0x003e66, 0x00347c, // e = –11/32
0x146c00, 0x067a02, 0x027E0f, 0x006a22, 0x005d35, 0x00524a, 0x00465e, 0x003c74, // e = –9/32
0x1c6400, 0x0d7500, 0x057909, 0x02701a, 0x01652d, 0x00e456, 0x00446c, // e = –7/32
0x245c00, 0x156d00, 0x097905, 0x047513, 0x026b25, 0x01613a, 0x01564e, 0x004b64, // e = –5/32
0x2c5400, 0x1d6500, 0x0f7602, 0x08770d, 0x04711e, 0x036732, 0x025d46, 0x01535c, // e = –3/32
0x344c00, 0x255d00, 0x176f00, 0x0d7708, 0x087517, 0x056d2a, 0x03633e, 0x025954, // e = –1/32
0x3c4400, 0x2d5500, 0x1f6700, 0x137504, 0x0c7611, 0x087122, 0x066936, 0x04604c, // e = 1/32
0x443c00, 0x354d00, 0x275f00, 0x1a7002, 0x11760c, 0x0c741c, 0x096e2f, 0x076544, // e = 3/32
0x4c3400, 0x3d4500, 0x2f5700, 0x226a00, 0x177508, 0x107516, 0x0c7127, 0x096a3c, // e = 5/32
0x542c00, 0x453d00, 0x374f00, 0x2a6200, 0x1e7104, 0x167510, 0x107421, 0x0d6f34, // e = 7/32
0x5c2400, 0x4d3500, 0x3f4700, 0x325a00, 0x256b02, 0x1c740c, 0x15751b, 0x11722d, // e = 7/32
0x641c00, 0x552d00, 0x473f00, 0x3a5200, 0x2d6501, 0x227108, 0x1b7515, 0x157426, // e = 11/32
0x6c1400, 0x5d2500, 0x4f3700, 0x424a00, 0x355d00, 0x2a6d05, 0x217410, 0x1a7520, // e = 13/32
0x740c00, 0x651d00, 0x572f00, 0x4a4200, 0x3d5500, 0x326703, 0x27710c, 0x20751a, // e = 15/32
0x7c0400, 0x6d1500, 0x5f2700, 0x523a00, 0x454d00, 0x3a6101, 0x2f6e09, 0x267415, // e = 17/32
0x800000, 0x750d00, 0x671f00, 0x5a3200, 0x4d4500, 0x425900, 0x366906, 0x2d7211, // e = 19/32
0x800000, 0x7d0500, 0x6f1700, 0x622a00, 0x553d00, 0x4a5200, 0x3e6303, 0x346f0d, // e = 21/32
0x800000, 0x800000, 0x770f00, 0x6a2200, 0x5d3500, 0x524a00, 0x465d02, 0x3c6a09, // e = 23/32
0x800000, 0x000000, 0x7f0700, 0x721a00, 0x652d00, 0x5a4200, 0x4e5601, 0x446507, // e = 25/32
0x800000, 0x800000, 0x800000, 0x701200, 0x6d2500, 0x623a00, 0x564e00, 0x4c6004, // e = 27/32
```

-continued

```
0x800000, 0x800000, 0x800000, 0x800a00, 0x751d00, 0x6a3200, 0x5e4600, 0x545902, // e = 29/32
0x800000, 0x800000, 0x800000, 0x800200, 0x7d1500, 0x722a00, 0x663e00, 0x5c5301  // e = 31/32
};
```

Returning to the discussion of FIG. 4, the pixel coverage information 92 is provided to blending circuit 58. The blending circuit 58 blends color data 94 based on the coverage information and a pixel-scaling factor to obtain the pixel information 100. The coverage information 92 and the pixel-scaling factor 96 are used to established the intensity of the color data 94, thereby producing the pixel information 100. The blending circuit 58 receives the pixel-scaling factor 96 from the end-point circuitry 60, which indicates when the line is at an end-point (ie., when end-point information 98 is received). Thus, if the particular pixel of interest were at the end-point, the end-point circuitry 60 would generate the scaling factor 96 to correctly adjust the intensity produced by the blending circuit 58.

The resulting pixel information of 100 would then be stored in a frame buffer and subsequently displayed on a computer screen. With such a circuit as described, existing video graphics circuitry can be leveraged to obtain an economical, high quality line anti-aliasing process. In particular, by taking advantage of the Bresenham technique, error terms may be generated to address a look-up table to retrieve pixel coverage information. As such, a minimal amount of additional circuitry and memory are needed to provide line anti-aliasing.

Figure 5:
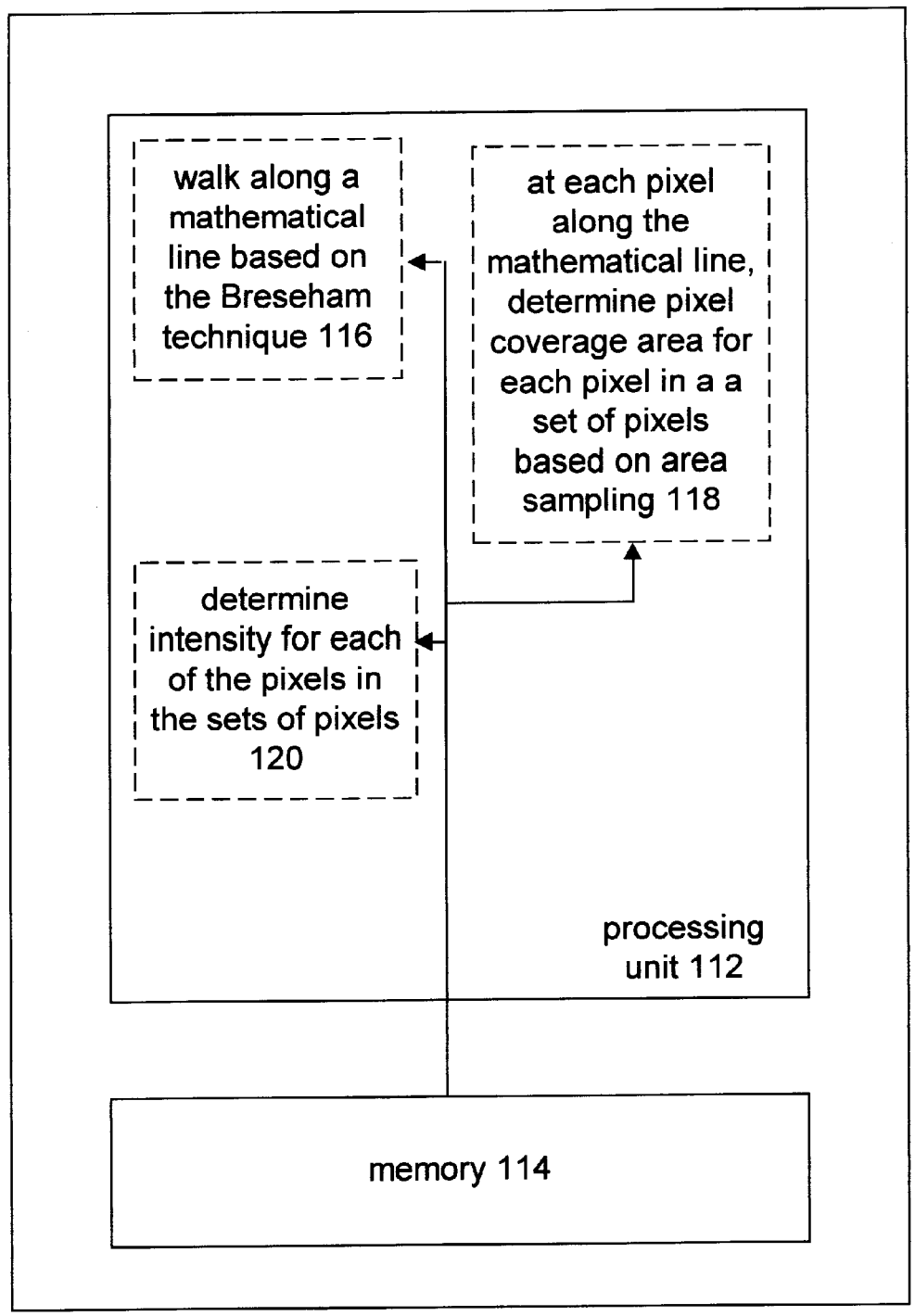
FIG. 5 illustrates a schematic block diagram of a video processing circuit that performs an alternate line anti-aliasing processing in accordance with the present invention.

FIG. 5 illustrates a schematic block diagram of an alternate anti-aliasing processing circuit 110. The anti-aliasing processing circuit 110 includes a processing unit 112 and memory 114. The processing unit 112 may be a microprocessor, micro-controller, central processing unit, digital signal processor, microcomputer, or any other device that manipulates digital information based on programming instructions. The memory 114 may be read-only, random access memory, programmable memory, hard disk memory, floppy disk memory, CD ROM memory, or any other means for storing digital information.

Memory 114 stores programming instructions that, when read by the processing unit 112, causing the processing unit to function as a plurality of circuits 116–120. While reading the programming instructions, the processing unit 112 functions as a circuit 116 to walk along a mathematical line based on the Bresenham technique. While doing this, the processing unit also functions as a circuit 112, which, at each pixel along the mathematical line, determines pixel coverage area for each pixel in a set of pixels based on area sampling. Note that area sampling is done by computing the intersections of the pixel to generate a polygon. Once the intersections have been determined, the area of the polygon can be readily calculated. The processing unit then functions as circuit 120 to determine intensity for each pixel of the pixels in the set of pixels. The functionality of processing unit 112 while performing the programming instructions stored in memory 114 can be further described with reference to FIG. 6.

Figure 6:
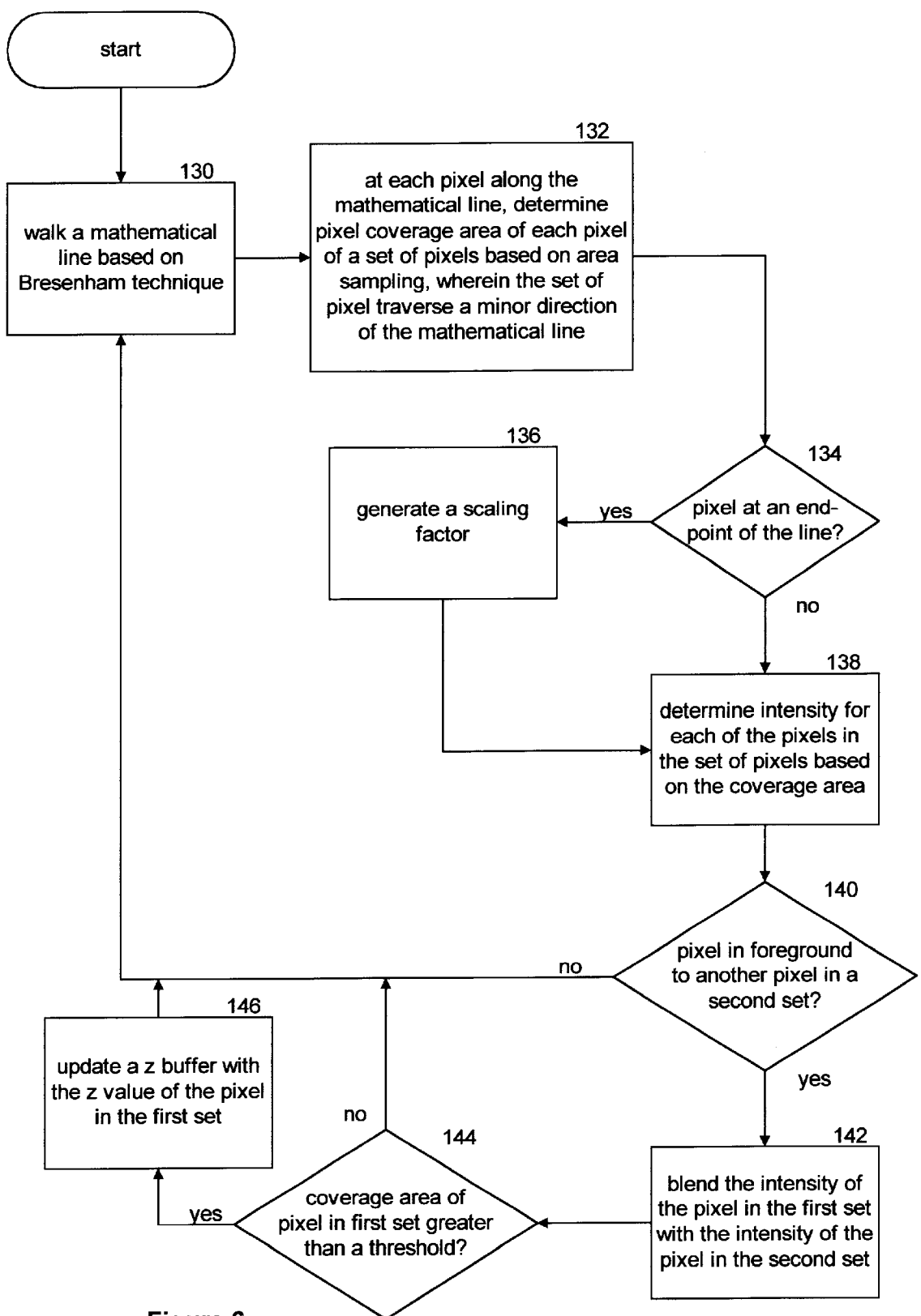
FIG. 6 illustrates a logic diagram of a method for processing line anti-aliasing in accordance with the present invention.

FIG. 6 illustrates a logic diagram of a method for processing and line anti-aliasing. The process begins at step 130 where a mathematical line is walked based on the Bresenham technique. This has been previously discussed with reference to FIGS. 1 through 3. The process then proceeds to step 132 where at each pixel along the mathematical line, pixel coverage area is determined for each pixel in a set of pixels, which transverse a minor direction of the mathematical line. The pixel area coverage determination is based on area sampling, which utilizes pixel intersections to calculate the area, and may be obtained in a variety of ways. For example, an error term for a pixel along the mathematical line may be calculated from a Bresenham error term as the mathematical line is walked. The error term and the slope of the mathematical line are used to address a look-up table, which stores pre-calculated coverage areas. As an alternate example, the coverage area could be determined on the fly based on points of intersection. Note that if the line has a thickness greater than 1 pixel, additional addresses would be generated for each additional pixel in the set of pixels.

Having determined the pixel coverage area for a pixel, the process proceeds to step 134 where a determination is made as to whether the pixel is at an end point of the line. If yes, a scaling factor is generated at step 136. The generation of a scaling factor was discussed previously with FIGS. 1 through 4. Once the scaling factor has been generated or the pixel is not at the end of the line, the process proceeds to step 138. At step 138 the intensity for each pixel of the pixels in the set of the pixels is determined based on the coverage area. This was discussed previously with reference to FIGS. 1 through 4.

The process then proceeds to step 140 where a determination is made as to whether the pixel is in a foreground relationship to another pixel in a second set. In other words, does the current line intersect another line and, if so, which was is closer. This determination is done on a pixel by pixel basis. If, the answer to the query at step 140 is negative, the process reverts back to step 130.

If, however, the pixel is in a foreground relationship to another pixel in a second set, the process proceeds to step 142. At step 142, the intensity of the pixel in the first set is blended with the intensity of the pixel in the second set. As such, the blending is done based on the proportional coverage of the area. For example, if the first pixel covers the pixel location by forty percent (40%) and the color is a bright green and the other pixel covers the pixel location by thirty percent (30%) and it is a bright red, the resulting combination would be an RGB value that includes the proportional contributes of the lines. The process then proceeds to step 144 where a determination is made as to whether the coverage area of the pixel in the first set is greater than a threshold. The pixel coverage threshold is an arbitrary value set by a designer and may be in the range of twenty-five percent (25%) to one hundred percent (100%) of the pixel. If the coverage area does not exceed the threshold, the process reverts to step 130. If, however, the coverage area exceeds the threshold, the process proceeds to step 146. At step 146, a Z buffer is updated with the Z value of the pixel in the first set. The Z value indicates its image's depth which is stored in the Z buffer when it is in the most foreground position. Note that, if the threshold is set to be 50%, only the z value for the center trace needs to be updated.

Figure 7:
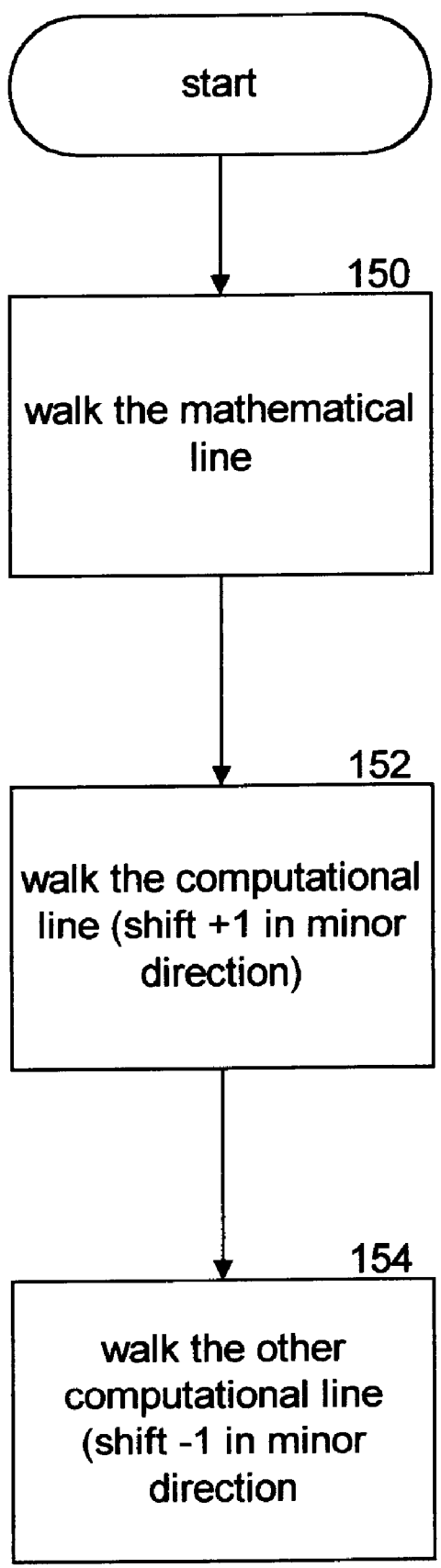
FIG. 7 illustrates a logic diagram of an alternate method for processing line anti-aliasing in accordance with the present invention.

FIG. 7 illustrates a logic diagram of an alternate method for line anti-aliasing. The process begins at step 150 where the mathematical line is walked to obtain pixel coverage area at each point along the mathematical line. The process then proceeds to step 152 where a computational line is walked to obtain pixel coverage area at each point along the computational line. This computational line corresponds to the mathematical line shifted plus one in the minor direction. The process then proceeds to step 154 where the other computational line is walked to obtain pixel coverage area at each point along this computational line. This particular computational line corresponds to the mathematical line minus one in the minor direction The preceding discussion has presented a method and apparatus for generating line anti-aliasing. The line anti-aliasing method and apparatus of the present invention leverage existing video graphic technologies to minimize additional circuitry requirements and memory requirements. While memory and circuitry requirements are minimized, the video quality of line anti-aliasing is not.

What is claimed is:

1. A circuit for processing line anti-aliasing, the circuit comprises:

an error term circuit operably coupled to receive a Bresenham error term for each pixel along a mathematical line and to receive a representative value of te mathematical line, wherein the error term circuit generates an error term for each pixel along the mathematical line based on the Bresenham error term for the pixel and the representative value, an address generation circuit operably coupled to the error term circuit and operably coupled to receive a slope of the mathematical line, wherein the address generation circuit generates a set of addresses based on the error term and slope, wherein each address of the set of addresses corresponds to a pixel in a set of pixels, wherein the set of pixels traverse a minor direction of the mathematical line;

a look-up table operably coupled to the address generation circuit, wherein the look-up table outputs pixel coverage information for each pixel in the set of pixels based on the set of addresses, and wherein the pixel coverage information is used to create an anti-aliased representation of the mathematical line;

the error term circuit having a shifting circuit operably coupled to receive the Bresenham error term and the representative value, wherein the shifting circuit shifts the Bresenham error term based on the representative value to produce a shifted Bresenham error term, and the error term circuit also having a multiplier circuit operably coupled to the shifting circuit, wherein the multiplier circuit multiplies the shifted Bresenham error term with at least a portion of the representative value to produce a multiplied Bresenham error term; and the address generation circuit having an offset circuit operably coupled to receive the error term, wherein the offset circuit offset the error term by an offset value to produce an error term index, wherein the error term index is combined with the slope to produce the set of addresses.

2. The circuit of claim 1 further comprises the representative value being an inversion of delta major of the mathematical line.

3. The circuit of claim 1, further comprises the address generation circuit being operably coupled to receive line thickness information, wherein the address generation circuit further utilizes the line thickness information to generate the set of addresses.

4. The circuit of claim 1 further comprises a slope circuit that generates the slope based on a delta major and a delta minor of the mathematical line.

5. A circuit for processing line anti-aliasing, the circuit comprises:

an error term circuit operably coupled to receive a Bresenham error term for each pixel along a mathematical line and to receive a representative value of the mathematical line, wherein the error term circuit generates an error term for each pixel along the mathematical line based on the Bresenham error term for the pixel and the representative value;

an address generation circuit operably coupled to the error term circuit and operably coupled to receive a slope of the mathematical line, wherein the address generation circuit generates a set of addresses based on the error term and slope, wherein each address of the set of addresses corresponds to a pixel in a set of pixels, wherein the set of pixels traverse a minor direction of the mathematical line;

a look-up table operably coupled to the address generation circuit, wherein the look-up table outputs pixel coverage information for each pixel in the set of pixels based on the set of addresses, and wherein the pixel coverage information is used to create an anti-aliased representation of the mathematical line; and the address generation circuit having a pixel value offset circuit that generates a pixel offset value based on waling of the mathematical line and computational lines, wherein the pixel offset value is null when walking the mathematical line and is not null when walking one of the computational lines, wherein the computational lines are each substantially parallel to the mathematical line and offset in the minor direction by the pixel offset value and wherein the pixel offset value is at least partially used to generate an address of the set of addresses that corresponds to a pixel of the set of pixels that is on one of the computational lines.

* * * * *